US011715076B2

(12) United States Patent
Dhar et al.

(10) Patent No.: US 11,715,076 B2
(45) Date of Patent: Aug. 1, 2023

(54) USER INTERFACES FOR ACCOUNT STATEMENT ASSIGNMENT

(71) Applicant: PAYPAL, INC., San Jose, CA (US)

(72) Inventors: Shilpa Dhar, Los Altos, CA (US); Jason Brightman, Oakland, CA (US); Alexander C. Simonson, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/917,787

(22) Filed: Jun. 30, 2020

(65) Prior Publication Data
US 2021/0406847 A1    Dec. 30, 2021

(51) Int. Cl.
*G06Q 20/10* (2012.01)
*G06Q 20/38* (2012.01)
*G06Q 20/36* (2012.01)
*G06Q 20/22* (2012.01)

(52) U.S. Cl.
CPC ......... *G06Q 20/102* (2013.01); *G06Q 20/223* (2013.01); *G06Q 20/3676* (2013.01); *G06Q 20/384* (2020.05)

(58) Field of Classification Search
CPC ............... G06Q 20/102; G06Q 20/223; G06Q 20/3676; G06Q 20/384
See application file for complete search history.

(56) References Cited

U.S. PATENT DOCUMENTS

| | | | |
|---|---|---|---|
| 7,698,218 B1 * | 4/2010 | Opaluch | G06Q 20/102 705/40 |
| 9,990,621 B1 * | 6/2018 | Ng | G06Q 20/42 |
| 2006/0229984 A1 * | 10/2006 | Miyuki | G07G 1/12 705/40 |
| 2015/0073959 A1 * | 3/2015 | Connors | G06Q 40/00 705/35 |
| 2015/0142661 A1 * | 5/2015 | Jain | G06Q 20/389 705/35 |
| 2015/0324766 A1 * | 11/2015 | Park | G06Q 20/352 705/39 |
| 2017/0193477 A1 * | 7/2017 | Holt | G06Q 20/102 |
| 2017/0357972 A1 * | 12/2017 | Van Os | G06Q 20/29 |

(Continued)

OTHER PUBLICATIONS

Dillet, Romain. "Revolut Lets you Split Bills in a Few Taps," https://techcrunch.com/2017/01/17/revolut-lets-you-split-bills-in-a-few-taps/ (Jan. 17, 2017). (Year: 2017).*

*Primary Examiner* — Elizabeth H Rosen
(74) *Attorney, Agent, or Firm* — Haynes and Boone, LLP

(57) ABSTRACT

There are provided systems and methods for user interfaces for account statement assignment. A user may engage in transactions over a time period, such as purchases of goods, services, or other items using a physical payment card associated with an online transaction processor. A statement may be issued at the completion of the time period, where the statement may include account information requiring a payment by the user, such as a statement balance. The user may request for another user to provide a payment for all or a portion of the balance using one or more user interfaces of a peer-to-peer payment and social networking platform. Thereafter, a request may be provided to the other user, which may request the payment. The other user may process the payment, which may be used to provide funds directly to the statement balance.

20 Claims, 5 Drawing Sheets

(56) References Cited

U.S. PATENT DOCUMENTS

2020/0134600 A1\* 4/2020 Koeppel ............. H04L 63/0853
2020/0160296 A1\* 5/2020 Park ................... G06Q 20/3223
2020/0265409 A1\* 8/2020 Babu ...................... G06N 20/00

\* cited by examiner

US 11,715,076 B2

USER INTERFACES FOR ACCOUNT STATEMENT ASSIGNMENT

TECHNICAL FIELD

The present application generally relates to device interactions through interface elements and application operations, and more particularly to assigning account statement data to other users through mobile application interfaces.

BACKGROUND

Users may utilize online transaction processors for processing payments between different entities through device applications and digital accounts. Further, these online transaction processors or other service providers may also provide physical payment cards for in-person transaction processing and use at merchant locations. When conducting transactions utilizing an amount of extended credit, a billing statement may result at the end of a billing cycle, which requires settlement by the user. However, the user may be responsible for all or portions of payments used for purchases the user did not make for himself, or the user may be associated with another user that provided payment for some or all of the statement's balance. Thus, the user may wish to request a payment for all or a portion of the statement's balance. However, the other users may want to ensure that any payment is applied directly to the balance and not used fraudulently. Moreover, the other users may be required to navigate multiple interfaces. For example, a peer-to-peer networking platform of the online service provider may have many identifiers and usernames, which may be similar, and may lead to mistakes in locating proper users. Thus, providing balance payments by other users may lead to potential fraud and time-consuming data inputs and interface navigations.

Figure 1:
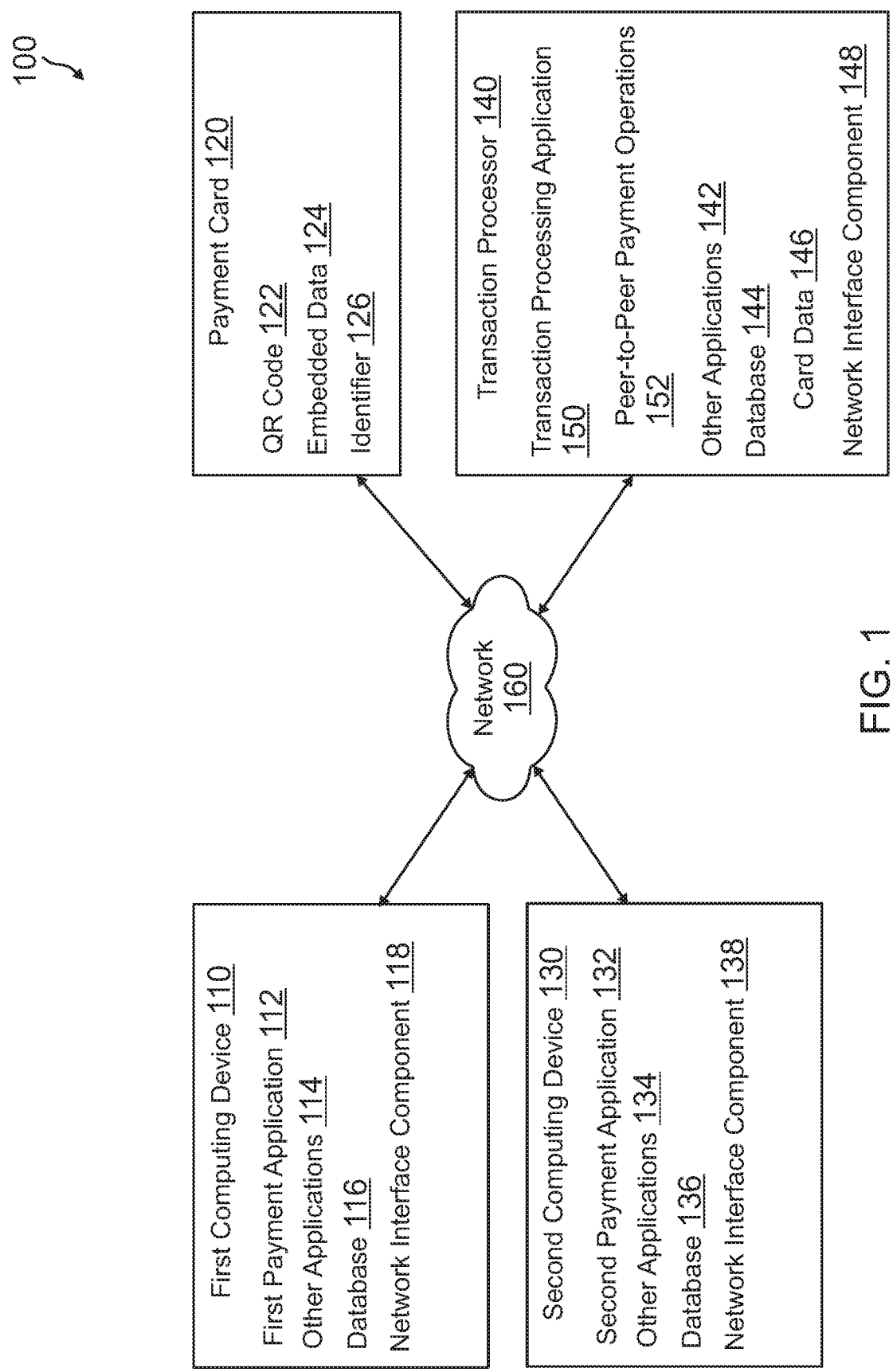
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for user interfaces for account statement assignment. Systems suitable for practicing methods of the present disclosure are also provided.

A user may utilize a payment card to process payments through an electronic card or transaction network associated with a backend payment processor or other entity on the network. This payment card may be linked to a digital account of the user with an online transaction processor or other service provider, such as a payment service provider (e.g., PayPal®, Venmo®, etc.), which may provide electronic transaction processing services to users through the account and one or more websites and/or applications of the online transaction processor or a merchant. The payment card may be established with a credit limit and/or digital/virtual currency that allows for purchasing of items without directly providing funds available to the user. Thus, the user may later be required to provide a payment for settlement of a billing statement, such as at time intervals corresponding to billing cycles. The online transaction processor may include an integration with the electronic card network that allows for data exchange and communications between the two networks. The online transaction processor may monitor the payment card and/or digital accounts usage of the credit limit so that balances and billing statements may be received, such as at different time periods for weekly, monthly, or the like (e.g., after a billing cycle). Thereafter, the user may utilize an application or website of the online transaction processor to request a payment by one or more other users for all or a part of the statement. In this regard, the requesting user may add one or multiple names to the request to pay all or a portion of the billing statement, which may initially be split into equal parts and/or later amended to have certain users pay less or more. The request may be performed through one or user interfaces and transmitted so that the request is populated within an interface of the other user. The other user(s) may then elect to provide the payment, which may cause the payment to be directly applied to the statement's balance without increasing an available funds balance of the requesting user's account, thereby preventing the requesting user from using the funds in an unauthorized manner.

For example, a user may wish to process a purchase of the items via a digital account and/or payment card that provides values, credit, or other funds to the user through an online transaction processor and/or electronic card network. Selection of one or more items for an in-person transaction at a physical merchant location or via an online marketplace or other digital platform may require a payment instrument from the user for electronic transaction processing. A user may pay for one or more transactions using a digital wallet or other account with an online service provider or other transaction processor (e.g., PayPal®), as well as the payment card (e.g., through proffering the physical card and reading card data or by entering card details and/or account numbers). An account and/or corresponding payment card with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments, which may be used to process transactions after identity confirmation. Account creation may also be used to establish a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services. The digital account linked to the payment card may also correspond to a peer-to-peer payment account and/or social networking account, such as one that may be used on a peer-to-peer payment and social networking platform provided by the online transaction processor. Moreover, the digital account may be utilized through one or more mobile applications for mobile devices.

In order to pay for the transaction (e.g., a transfer or payment to another user, merchant, or other entity), the user may provide the payment card or may login to an account with the service provider through authentication information and provide a digital payment. A payment may then be issued to the other party to the transaction and transaction information may be stored with the digital wallet or account. In this regard, a digital token or other data may authorize and/or authenticate the user and/or use of the payment card, which may be transmitted to another party for payment processing. The data may be stored to one or more storage mediums on the payment card, such as a magnetic stripe or an EMV chip. For example, a POS device and/or card reader may be used to read the card data from a merchant device at a merchant location. This may allow for single user payments through a payment account and/or digital wallet. In some embodiments, the account and/or digital wallet may be linked to the user's device or application and a one-touch or other checkout process may be authorized by the user, where selection of the account or other data may automatically initiate the process to purchase the item using the account and/or digital wallet.

Once the payment card is opened, such as a credit card is opened, established, and/or linked to the user's digital account, the user may receive an available credit balance for use with the payment card and/or digital account. This may correspond to a real or virtual asset or value linked to a revolving credit limit extended to the user. For example, the user may be extended a maximum credit limit (e.g., $5,000, $10,000, $30,000), where the user may be required to perform a payment, statement payoff, or other settlement in response to a billing statement that accrues every billing cycle. In a revolving credit billing cycle or time period, the user may be required to provide a repayment of any borrowed credit used by the user against the user's credit line. However, the user may not be responsible for all or a portion of the used credit that requires repayment. For example, the credit card and/or credit limit may be used by one user, such as a child, spouse, or dependent user, where another user provides billing statement payments for the user utilizing the payment card and line of credit. When using the payment card to pay for a transaction, the user associated with the payment card may provide a payment on behalf of another user, such as in a split transaction where the user pays for one or more items for the user and one or more other users. At other times, the user may want to request a payment applied to the balance due to changes in finances or gifts from other users.

In some embodiments, the online transaction processor may receive the account statement from the backend credit card or bill processor that extends the line of credit to the user. The online transaction processor may instead act as the backend processor that extended the credit, approves/declines transactions, and generates the transaction history and billing statement. Further, in some embodiments, the online transaction processor may utilize the API integrations and calls with the electronic card network to receive the transaction data for transactions processed by the user, and aggregate or collect into an account statement. This may be done by detecting the transactions on the electronic card network, such as by listening to card reading and/or scanning events and receiving corresponding transaction information, or by monitoring incoming communications from the electronic card network, merchants, point-of-sale (POS) devices, and the like.

The online transaction processor may then present one or more user interfaces that display and render the transaction history and billing statement/balance to the first user associated with the payment card and credit limit on a computing device of the first user. The first user may then request one or more other users to provide a payment for all or a portion of the statement balance of the payment card and/or credit limit from the billing statement, which may have results from transactions using the credit limit in the last or a previous billing cycle. Where a total payoff of the balance is requested, the first user may designate the entire balance to be paid off. However, where a partial payment is requested for a portion of the balance, the first user may select an amount, fractional amount, percentage of the balance, and/or one or more individual transactions from the statement for a statement payment by the other user. Further, if a partial payment is requested from one or more other users by the first user, the first user may further designate one or more additional users to provide further payments for additional amounts, percentages, transactions, etc., which may be applied to the statement balance.

The first user may utilize one or more interfaces of the online transaction processor, such as webpage interfaces, application interfaces, and other user interfaces that may be presented through a graphical user interface (GUI) of a computing device, in order to view the statement and assign payments to other users. For example, the first user may view an interface displaying at least the statement balance (as well as possibly the transaction history for the statement) and one or more fields or menus to selection of the amount of the payment to assign to a second (and third, fourth, etc.) users. When entering the amount of the payment, a field and/or option may allow for entry of the amount, selection of the entire balance, and/or selection of individual transactions. The user may also view a deadline for settlement and payment for the statement balance, as well as set deadlines for acceptance or declination of the requested payment by the second user.

When designating the second user, third user, and so on, the first user may also be required to select or enter an identifier for the other users. For example, the user may access a contact list, such as an address book, social networking "friends" list, or list of connected users on a peer-to-peer payment and/or social network platform. The identifier may also be determined and/or suggested to the first user from past payment requests by the first user to the other users, and/or past statement payments made by the second user to the first user. For example, the second user may also be connected to the first user based on the payment card and/or credit limit, such as a co-signee for credit, another authorized user of the payment card, or the like. The second user may also be connected to the first user based on a location-based detection of the second user, a scan of a QR code on the payment card, a calendar invitation and corresponding meeting (e.g., a dinner, a work meeting or appointment, or the like), and/or another parameter of the first user and the second user. The other users may all be designated and an amount for each user may be specified. Initially, the amount may be split evenly where multiple users are requested to provide the statement balance payment. However, the first user and/or the other users may also change the amounts requested from each user, for example, to provide different balance payment requests.

Once the necessary information is entered by the first user to the user interfaces for requesting the payment, the first user may authorize transmitting the request to the second user. The second user may receive a notification of the request, such as a text (SMS/MMS) message, email, application push message, or the like. The second user may then access the notification, which may present the request to the user (e.g., the first user's identifier and the requested amount) and/or navigate the user to one or more interfaces to provide the balance payment or payoff. If the user accepts to provide the payment, the second user may provide a payment instrument for the payment, such as a payment card, financial account and/or value balance, and/or digital account with the online transaction processor.

The second user may also change the value of the payment requested by the first user, such as by increasing or decreasing the amount or requested percentage, or by selecting additional transactions or refusing repayment for certain transactions. Thus, in some embodiments, the payment request provided to the second user may show additional information to the second user, such as an entire statement balance, transaction history, or the like. If a payment is accepted and provided by the second user, the selected payment instrument may be processed to obtain the payment and apply the payment directly to the statement balance of the first user. In some embodiments, the payment may be performed through a peer-to-peer digital account on a peer-to-peer payment platform and/or mobile application. In such embodiments, the payment instrument and/or balance of the second user may then be applied to the statement balance of the first user on the peer-to-peer payment platform and/or through one or more API integrations and calls with the backend card processor and electronic card network. This may be done to prevent unauthorized use of the payment's funds by the first user. However, the first user and/or second user may also designate that the payment may be provided to a balance of available funds, such as a bank or debit balance of available funds. In contrast, if the second user declines to provide the payment, no payment instrument may be processed, and no balance may be adjusted. Further, the first user may be notified that the second user declined the payment so that the first user may select a third or fourth user to request repayment. If the second user does not accept the payment by the established deadline, the payment request may be canceled, and the first user may be notified.

In response to providing the payment, the first user and/or the second user may be provided with an option to provide a social networking post or other visible message to other users on a peer-to-peer payment or social network. In some embodiments, the post may be automatically provided and/or shared depending on account settings of the first user and/or second user. Additionally, the payment by the second user may include stipulations for providing the payments, such as that the first user complete a task, change their spending habits, or otherwise perform an action. The payment may be held in escrow until the required action is completed and/or the second user is satisfied that the action is completed. However, in other embodiments, the payment may be immediately applied to the balance for the statement of the first user, and the required action may be provided to the first user and/or monitored for completion. The second user may be notified when the required action is completed or if the action is not completed by an established deadline.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a first computing device 110, a payment card 120, a second computing device 130, and a transaction processor 140 in communication over a network 160. First computing device 110 may be used by a user to request for a payment for all or a portion of a statement balance for payment card 120. Thus, the user associated with first computing device 110 may request the payment after viewing a billing statement and balance after a billing cycle. Thereafter, second computing device 130 may receive the payment request, and may process the payment request to send to provide the payment for all or a portion of the statement balance, which may be facilitated through digital accounts and processing operations of transaction processor 140.

First computing device 110, a second computing device 130, and a transaction processor 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

First computing device 110 may be implemented using any appropriate hardware and software configured for wired and/or wireless communication with second computing device 110 and/or transaction processor 140 for establishing and processing a transaction based on one or more of first computing device 110 and/or payment card 120. First computing device 110 may correspond to a first that request a payment or transfer for all or a portion of an account statement for extended credit associated with first computing device 110 and/or second computing device 130. In various embodiments, first computing device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

First computing device 110 of FIG. 1 contains a first payment application 112, other applications 114, a database 116, and a network interface component 118. First payment application 112 and other applications 114 may correspond to executable processes, procedures, and/or applications with associated hardware. In other embodiments, first computing device 110 may include additional or different software as required.

First payment application 112 may correspond to one or more processes to execute software modules and associated components of first computing device 110 to process electronic transactions at a physical merchant location or over a network with an online marketplace by a first user associated with first computing device 110, as well as requesting payments for all or a portion of a statement balance for extended credit to the first user. In this regard, first payment application 112 may correspond to specialized hardware and/or software utilized by the second user of first computing device 110 to establish a transaction, for example, by requesting purchase of certain items at a physical location or accessing a website or an interface of a marketplace or other sales platform to browse item data for items for sale. At a physical merchant location, first payment application 112 may designate the items for purchase or the first user may bring items to a checkout, where payment card 120 and/or first computing device 110 may provide card data, account data, or other financial data to process the transaction. With digital transactions, first payment application 112 may designate the items for purchase through the online marketplace for the merchant and provide the card data, account login and/or account data, financial data, or a digital token used to pay for the transaction data and perform transaction processing. For example, the transaction data may be received via a checkout interface dynamically rendered through first payment application 112. First payment application 112 may further provide one or more user interfaces to request payments or transfers from the second user associated with second computing device 130, for example, in response to a billing statement and statement balance for repayment of credit extended to the first user through first payment application 112 and/or payment card 120, where the payment may be processed by transaction processor 140.

As discussed herein, first payment application 112 may utilize user financial information, such as credit/debit card data (including payment card 120's corresponding data such as identifier 126), bank account data, or other funding source data, as a payment instrument when providing payment information for a transaction. This may include credit extended to the first user through payment card 120, which may also be accessible using first payment application 112. Additionally, first payment application 112 may utilize a digital wallet associated with an account with a payment provider as the payment instrument, for example, through accessing a digital wallet or account of a user through entry of authentication credentials and/or by providing a data token that allows for processing using the account. First payment application 112 may also be used to receive a receipt or other information based on transaction processing. In various embodiments, first payment application 112 may correspond to a general browser application configured to retrieve, present, and communicate information over the Internet (e.g., utilize resources on the World Wide Web) or a private network. For example, first payment application 112 may provide a web browser, which may send and receive information over network 160, including retrieving website information, presenting the website information to the user, and/or communicating information to the website, including payment information for the transaction. However, in other embodiments, first payment application 112 may include a dedicated application of transaction processor 140 or other entity (e.g., a merchant), which may be configured to assist in processing transactions electronically.

In various embodiments, first payment application 112 may establish a payment request to provide a statement balance payment through one or more user interfaces provided by transaction processor 140, which may be provided through a digital payment platform including a peer-to-peer payment and social networking platform provided by transaction processor 140. First payment application 112 may display information for the payment request to be transmitted to second computing device 130, such as the amount, the balance of the statement, the statement transaction history, a message or social networking interaction, an identifier or account name for a second user associated with second computing device 130, and/or other account information such as a user profile. Thus, an interface of first payment application 112 may include interface data and interface elements that allow for interaction with the payment request and/or viewing additional transaction data for a statement balance payment associated with the payment request. During transaction processing, such as to request a payment or transfer from the second user's digital account on the platform to the first user's digital account, first payment application 112 may be utilized to select the associated statement balance and/or payment instrument associated with the statement balance payment.

In various embodiments, first computing device 110 includes other applications 114 as may be desired in particular embodiments to provide features to first computing device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. Other applications 114 may also include other location detection applications, which may be used to determine a location for first computing device 110, such as a mapping application. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use components of first computing device 110, such as display components capable of displaying information to users and other output components, including speakers.

First computing device 110 may further include database 116 which may include, for example, identifiers such as operating system registry entries, cookies associated with first payment application 112 and/or other applications 114, identifiers associated with hardware of first computing device 110, or other appropriate identifiers. Identifiers in database 116 may be used by a payment/service provider to associate first computing device 110 with a particular account maintained by the payment/service provider. Database 116 may also further store received transaction data for processed transactions, as well as card data, account data, or other financial data used to process such transactions and/or transmit payment requests for statement balance payments.

First computing device 110 includes at least one network interface component 118 adapted to communicate with second computing device 130 and/or transaction processor 140 over network 160. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Payment card 120 may correspond to a physical payment card and/or digital representation of a payment card that may be used to store card data corresponding to financial data used to process transactions. In some embodiments, payment card 120 may correspond to a standard sized card (e.g., ~85.×54 mm (3.37×2.125 in)) card having rounded corners) that include one or more storage mechanisms (e.g., magnetic stripe, EMV chip, NFC chip and/or antenna, or the like). Payment card 120 may also correspond to a key fob or other device that similarly may include a storage mechanism and may store data. In some embodiments, payment card 120 may be virtual and may be stored to another device, such as first computing device 110.

Payment card 120 may include a QR code 122 or be associated with QR code 122, which may link to backend data that allows accessing of a digital account based on encoded data in QR code 122. In other embodiments, any suitable machine-readable code may be used and is not limited to only a QR code. Additionally, different machine-readable codes may also be used in place of QR code 122, such as a barcode, graphical object, and the like, which may be visible or made invisible through infrared or ultraviolet imaging. Payment card 120 may also be configured to store card data corresponding to a card account, credit balance, or the like as embedded data 124. In other embodiments, embedded data 124 may be stored to other storage mediums, such as a non-transitory memory for an NFC or RFID chip and/or device. The linked balance (e.g., credit limit) may be used to provide payments, which may result in a credit balance statement required for repayment by a first user associated with first computing device 110. In this regard, a second user associated with second computing device 130 may provide a payment for all or a portion of the balance due for credit repayment in a credit account statement. In various embodiments, QR code 122 may be used to link to the account of the first user, such as when captured by the second user through second computing device 130, to provide the statement balance payment. Identifier 126 may also be provided on or with payment card 120, which may correspond to a card and/or account identifier. For example, identifier 126 may correspond to a 16 digit or other series of digits and/or alphanumeric codes, that allows for specific identification of an account and use of payment card 120 to process transactions. Identifier 126 may include multiple identifiers, including a user name, an expiration date, and/or a CCV number.

Second computing device 130 may be implemented using any appropriate hardware and software configured for wired and/or wireless communication with first computing device 110 and/or transaction processor 140 for processing payments and transfers with a first user associated with first computing device 110. For example, second computing device 130 may be used by a second user to provide a payment for a statement balance associated with the first user and/or payment card 120. Second computing device 130 may correspond to an individual user or consumer of transaction processor 140 that utilizes a peer-to-peer payment network and platform provided by transaction processor 130 to process those payments with first computing device 110. In various embodiments, second computing device 130 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

Second computing device 130 of FIG. 1 contains a second payment application 132, other applications 134, a database 136, and a network interface component 138. Second payment application 132 and other applications 134 may correspond to executable processes, procedures, and/or applications with associated hardware. In other embodiments, second computing device 130 may include additional or different software as required.

Second payment application 132 may correspond to one or more processes to execute modules and associated devices of second computing device 130 to provide a convenient interface to permit a user for second computing device 130 to enter, view, and/or process a transaction, as well as perform peer-to-peer payments and transfers on a payment platform provided by transaction processor 140 including those for statement balance payments for a balance associated with payment card 120. In this regard, second payment application 132 may correspond to specialized hardware and/or software utilized by second computing device 130 that may provide transaction processing for the items, such as through a user interface enabling the user to enter and/or view the items that the user associated with second computing device 130 wishes to purchase. Second payment application 132 may also be used by a second user to provide payments and transfers to a first user associated with first computing device 110. For example, second payment application 132 may utilize user financial information, such as credit card data, bank account data, or other funding source data, as a payment instrument when providing payment information to provide a statement account payment or otherwise process a transaction. Additionally, second payment application 132 may utilize a digital wallet associated with an account with a payment provider as the payment instrument, for example, through accessing a digital wallet or account of the second user after entry of authentication credentials and/or by providing a data token that allows for processing using the account.

Second payment application 132 may also be used to receive a payment request to perform the payment for the account and/or statement balance for used credit extended to the first user associated with first computing device 110 and/or payment card 120. In various embodiments, second payment application 132 may correspond to a general browser application configured to retrieve, present, and communicate information over the Internet (e.g., utilize resources on the World Wide Web) or a private network. For example, second payment application 132 may provide a web browser, which may send and receive information over network 160, including retrieving website information, presenting the website information to the user, and/or communicating information to the website, including payment information for the transaction. However, in other embodiments, second payment application 132 may include a dedicated application of transaction processor 140 or other entity (e.g., a merchant), which may be configured to assist in processing transactions electronically, such as a peer-topeer payment application associated with a peer-to-peer payment and social network platform provided by transaction processor 140.

Thus, second payment application 132 may be used to receive and view a payment request for a statement balance payment through one or more user interfaces of second payment application 132 after a first user associated with first computing device 110 enters the payment request. Additionally, when the payment request is entered by the first user, transaction processor 140 may provide a notification, such as a text message, push notification, email, or the like to second computing device 130. However, in other embodiments, the second user may utilize second payment application 132 to provide the statement balance payment without first receiving a payment request. For example, the second user may utilize second payment application 132 to capture an image of or otherwise scan a machine-readable code on payment card 120 and load an account identifier or other account information for a digital account of the first user. Thereafter, the second user may utilize second payment application 132 to provide a payment, which may include acceptance of responsibility to provide the requested amount by the first user for all or a portion of the statement, or entry of a different amount. Second payment application 132 may further be used to view a due date for payment of the statement balance and/or response to the payment request. Thereafter, second payment application 132 may display or otherwise present (e.g., based on the data provided by transaction processor 140) an application interface associated with a peer-to-peer payment from the second user's account to the first user's account, which may be applied to the statement balance or added to an available balance for the first user. The interface may include an option to enter an amount, send or request the amount, provide a message or graphical object, or otherwise converse and social network with the first user via the peer-to-peer payment platform. Further, second payment application may be used to decline a payment, request additional information, establish stipulations or other required actions for completion, and otherwise interact with the first user for providing a payment for an account or statement balance.

In various embodiments, second computing device 130 includes other applications 134 as may be desired in particular embodiments to provide features to second computing device 130. For example, other applications 134 may include security applications for implementing client-side security features, programmatic client applications for interfacing with appropriate application programming interfaces (APIs) over network 160, or other types of applications. Other applications 134 may also include email, texting, voice and IM applications that allow a user to send and receive emails, calls, texts, and other notifications through network 160. Other applications 134 may also include other location detection applications, which may be used to determine a location for second computing device 130, such as a mapping application. Other applications 134 may include device interface applications and other display modules that may receive input from the user and/or output information to the user. For example, other applications 134 may contain software programs, executable by a processor, including a graphical user interface (GUI) configured to provide an interface to the user. Other applications 134 may therefore use components of second computing device 130, such as display components capable of displaying information to users and other output components, including speakers.

Second computing device 130 may further include database 136 which may include, for example, identifiers such as operating system registry entries, cookies associated with second payment application 132 and/or other applications 134, identifiers associated with hardware of second computing device 130, or other appropriate identifiers. Identifiers in database 136 may be used by a payment/service provider to associate second computing device 130 with a particular account maintained by the payment/service provider. Database 136 may also further store received transaction data, as well as processed transaction data including those transactions used to provide a payment for all or a portion of a statement balance for a credit or other statement of another user. In this regard, database 136 may also store received payment requests for the statement balance payments.

Second computing device 130 includes at least one network interface component 138 adapted to communicate with first computing device 110 and/or transaction processor 140 over network 160. In various embodiments, network interface component 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction processor 140 may be maintained, for example, by an online service provider, which may provide processes to provide account services and process payments, as well as peer-to-peer or other payment and social networking services associated with an online digital platform and mobile applications. In this regard, transaction processor 140 includes one or more processing applications which may be configured to interact with first computing device 110, second computing device 130, and/or another device/server to facilitate communications and transactions between users. Transaction processor 140 may be maintained by or include another type of platform or service provider, for example, a transaction processor such as PAYPAL®, Inc. of San Jose, Calif., USA. Although first computing device 110 and transaction processor 140 are discussed as separate devices and servers, in some embodiments, one or more of the described processes of may instead be provided by the other device or server, or the same device or server.

Transaction processor 140 of FIG. 1 includes a transaction processing application 150, other applications 142, a database 144, and a network interface component 148. Transaction processing application 150, and other applications 142 may correspond to executable processes, procedures, and/or applications with associated hardware. In other embodiments, transaction processor 140 may include additional or different modules having specialized hardware and/or software as required.

Transaction processing application 150 may correspond to one or more processes to execute modules and associated specialized hardware of transaction processor 140 to process a transaction with first computing device 110, payment card 120, and/or second computing device 130, which may include transactions associated with a revolving credit balance and corresponding statement, as well as payments for a statement balance of the statement. In this regard, transaction processing application 150 may correspond to specialized hardware and/or software used by a user associated with first computing device 110 and/or second computing device to establish an account with transaction processing application 150 by providing personal and/or financial information to transaction processor 140 and selecting authentication credentials. In various embodiments, the financial information may include payment instrument information, such as account/card numbers and information. The account may include an account with payment card 120 that includes an amount of extended credit or other value that requires repayment after a time period, such as a monthly billing cycle. However, in other embodiments, the credit limit or other value may be extended to the user by another entity, such as a credit company that utilizes an electronic card network, where transaction processing application 150 includes one or more integrations and/or APIs for communications and data processing on the electronic card network.

The account may be used to purchase items and/or transfer funds, for example, through peer-to-peer payment operations 152 that allow for a peer-to-peer network and/or social networking environment that allows for interactions between different users, merchants, or other entities. The payment account may be accessed and/or used through a browser application and/or dedicated payment application executed by first computing device 110 and/or second computing device 130, such as first payment application 112 and/or second payment application 132. However, in other embodiments, a payment account may be generated by another online transaction processor or service provider and linked with transaction processor 140. Additionally, transaction processing application 150 may be used to create, establish, and/or link payment card 120 to the account of a user so that payments for one or more account statement balances associated with payment card 120 (e.g., for extended credit) may be processed and applied to the statement balance. Transaction processing application 150 may process a payment and may provide a transaction history for transaction authorization, approval, or denial.

Transaction processing application 150 may correspond to a product of service provider server 120 that may be utilized by end users, such as to perform electronic payments, transfers, and the like using one or more accounts and/or financial instruments. Transaction processing application 150 may also include or utilize different processors, engines, or models as required for an authentication, account setup and maintenance, electronic transaction processing, deposit and/or withdrawal, dispute resolution, and the like, for example, through peer-to-peer payment operations 152. Transaction processing application 150 may include one or more APIs utilized to communicate with first computing device 110, second computing device 130 and/or an electronic card network to exchange data and provide transaction processing for payments for statement balances. Thus, transaction processing application 150 may interact with the card network for payment card 120 and/or utilized by first computing device 110 used to process payment card 120 (e.g., through one or more API calls to APIs of transaction processing application 150 that interfaces with APIs of the electronic card network). Transaction processing application 150 may determine statement information, such as a statement balance, transaction history, and the like, which may be provided to first computing device 110. Further, transaction processing application 150 may be used to request payment requests for statement balances from first computing device 110, as well as process those payments between different devices, such as second computing device 130.

In various embodiments, transaction processor 140 includes other applications 142 as may be desired in particular embodiments to provide features to transaction processor 140. For example, other applications 142 may include security applications for implementing server-side security features, programmatic client applications for interfacing with appropriate application programming interfaces (APIs) over network 160, or other types of applications. Other applications 142 may contain software programs, executable by a processor, including a graphical user interface (GUI), configured to provide an interface to the user when accessing transaction processor 140, where the user or other users may interact with the GUI to more easily view and communicate information. In various embodiments, other applications 142 may include additional connection and/or communication applications, which may be utilized to communicate information to over network 160.

Additionally, transaction processor 140 includes database 144. Database 144 may store various identifiers associated with first computing device 110. Database 144 may also store account data, including payment instruments and authentication credentials, as well as transaction processing histories and data for processed transactions. Database 144 may store received data associated with a user for use with payment card 120, such as registration of payment card 120 and linking of an account identifier or other account information payment card 120. Additionally, database 144 may be used to store account statements and account statement information for users, as well as payment requests to have one or more other users to provide payments for all or a portion of the balances of the account statements.

In various embodiments, transaction processor 140 includes at least one network interface component 148 adapted to communicate first computing device 110, second computing device 130, and/or another device/server for a merchant over network 160. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
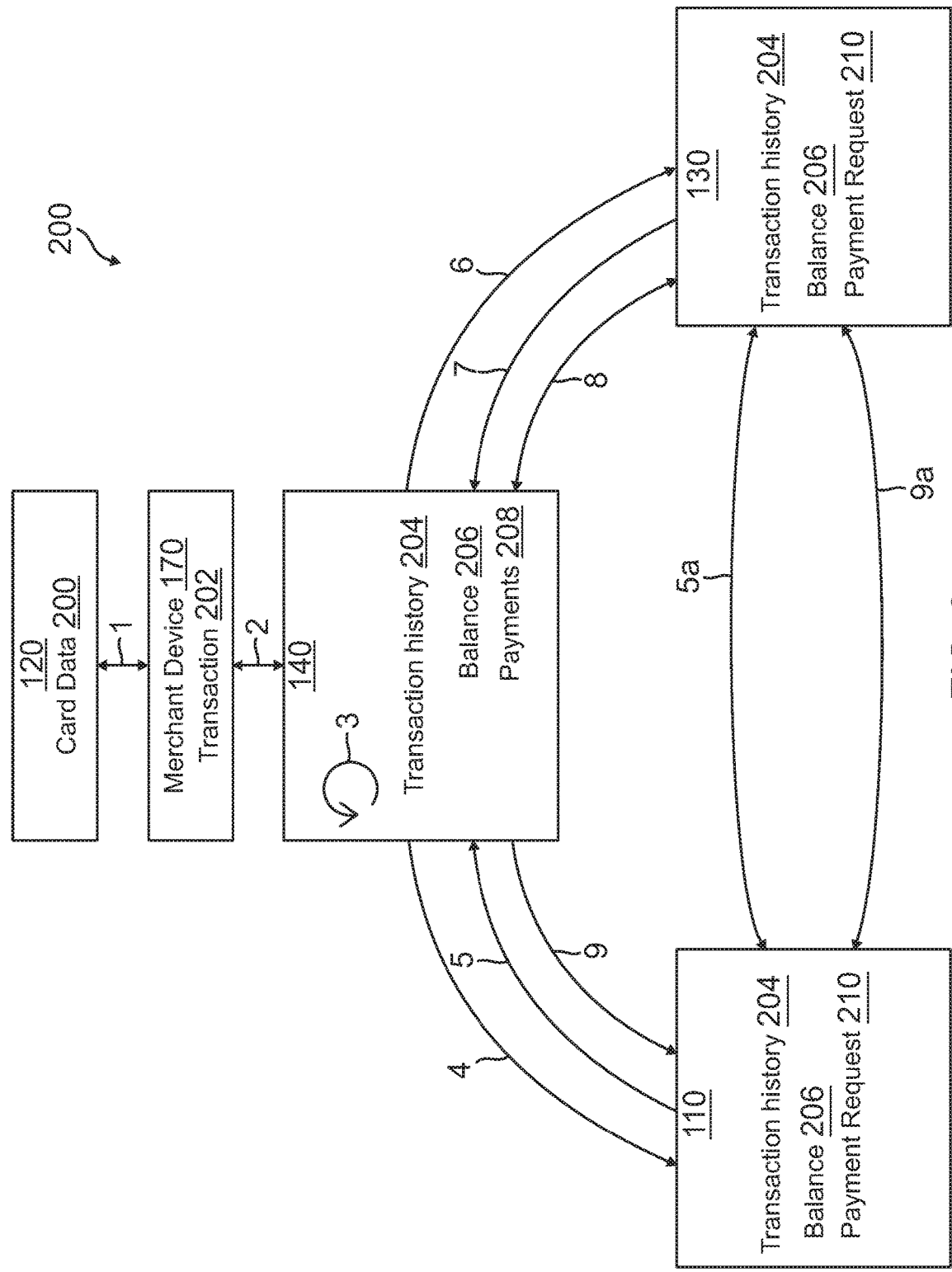
FIG. 2 are exemplary interactions used to provide an account statement balance assignment and payment of a user's payment card by a different user, according to an embodiment.

FIG. 2 are exemplary interactions 200 used to provide an account statement balance assignment and payment of a user's payment card by a different user, according to an embodiment. Interactions 200 of FIG. 2 including different communications, API calls, and the like between first computing device 110, payment card 120, second computing device 130, and transaction processor 140 discussed in reference to system 100 of FIG. 1.

In this regard, interactions 200 include a first interaction 1 between payment card 120 and a merchant device 170 where payment card 120 is provided to process a payment using card data 200 for a transaction 202. Interaction 1 may occur from an in-person interaction and/or online digital interaction that establishes transaction 202 to pay for one or more items, services, or the like. Thus, card data 200 may be entered to the transaction so a payment can be processed, for example, using a value extended to a first user associated with payment card 120 that requires later repayment and reimbursement (e.g., an amount of extended real or virtual credit). Thereafter, transaction 202 may be processed over an electronic card network and/or other digital payment network, which may resolve transaction processing and provide a payment to merchant device 170 and/or a merchant account utilized by merchant device 170. During or after electronic transaction processing for transaction 202 and/or additional transactions, at interaction 2, transaction processor 140 may receive the individual transactions and/or account statement and transaction history for payment card 120, which may include aggregated and collected transactions over a time period.

In some embodiments, transaction processor 140 may receive the account statement and transaction history at the end of the time period, such as when the account statement is generated by the billing entity (e.g., a credit card issuer and/or corresponding bank). However, in other embodiments, transaction processor 140 may monitor and aggregate the transactions over the time period to determine the account statement, transaction history, and/or corresponding balance. Thus, at interaction 3, a transaction history 204 is determined that includes a balance 206 for all transactions processed in a time period, as well as any remaining unpaid balances from previous time periods. Transaction processor 140 may also monitor and process payments 208 that may be applied to balance 206 for payments to satisfy or settle all or part of balance 206.

Thus, at an interaction 4, transaction history 204 and balance 206 may be provided to first computing device 110, such as in an account statement (e.g., credit card bill, monthly statement, or the like). The first user of first computing device 110 may then view transaction history and balance 206 and may provide a payment request 210, which requests that a second user associated with second computing device 130 provide a full or partial payment for balance 206. Thus, payment request 210 may be provided back to transaction processor 140 for transmission to second computing device 130 and/or processing with the second user's account at interaction 5. In some embodiments, in an optional interaction 5a, the first user and the second user may communicate directly through first computing device 110 and second computing device 130, such as to request the payment applied to balance 206, determine or negotiate an amount of payment request 210, directly transmit payment request 210 to second computing device 130 in a message or via a peer-to-peer payment platform, or otherwise communicate.

At interaction 6, payment request 210 is provided to second computing device 130. In interactions 200, payment request 210 is provided to second computing device 130 for viewing and processing with transaction history 204 and balance 206 so that the second user may view the corresponding information associated with payment request 210. However, in other embodiments, transaction history 204 and balance 206 may correspond to other data, such as other transaction histories and/or balances associated with the first user and the second user. For example, the first user may provide multiple requests for payment of at least a portion of balance 206 so that transaction history and/or balance 206 for payment request 210 on second computing device 130 may be different than requests sent to other devices. Additionally, transaction history 204 and/or balance 206 may be changed or updated for multiple incoming payment requests and/or show information for one or more transaction histories and/or balances of the second user or an account accessible by the second user.1

Although transaction history 204 and balance 206 are shown on second computing device 130 in interactions 200, in some embodiments, transaction history 204, balance 206, and/or other statement information may instead not be provided to second computing device 130, hidden from the second user, or not revealed (e.g., to maintain privacy of the first user). Thereafter, at interaction 7, the second user associated with second computing device 130 may agree to take responsibility for all or a portion of payment request 210. For example, the second user may agree to perform a full payoff of balance 206 based on payment request 210 or may agree to pay the amount requested by payment request 210. In other embodiments, the second user may change the parameters and/or amount of payment request 210, such as by paying more or less than requested in payment request 210.

Transaction processor 140 may therefore receive the agreed upon payment from the second user as one of payments 208. This includes payment processing that occurs between second computing device 130 and transaction processor 140 at interaction 8, such as to provide a payment instrument and process a transaction for the amount of the payment. This payment may correspond to one of payments 208, which may then be applied directly to balance 206 by providing a payoff of all or a portion of balance 206. This payment may be applied directly to reduce the outstanding amount of balance 206 with transaction processor 140 or may be processed over an electronic card network to provide a payment to a bank and/or credit card issuer for the amount of the payment. Thereafter, at interaction 9, the first user is notified of the payment applied to balance 206 through a notification from transaction processor 140 to first computing device 110. Further, at an optional interaction 9a, one or more communications and/or social networking posts may be exchanged and/or provided between first computing device 110 and second computing device 130.

Figure 3:
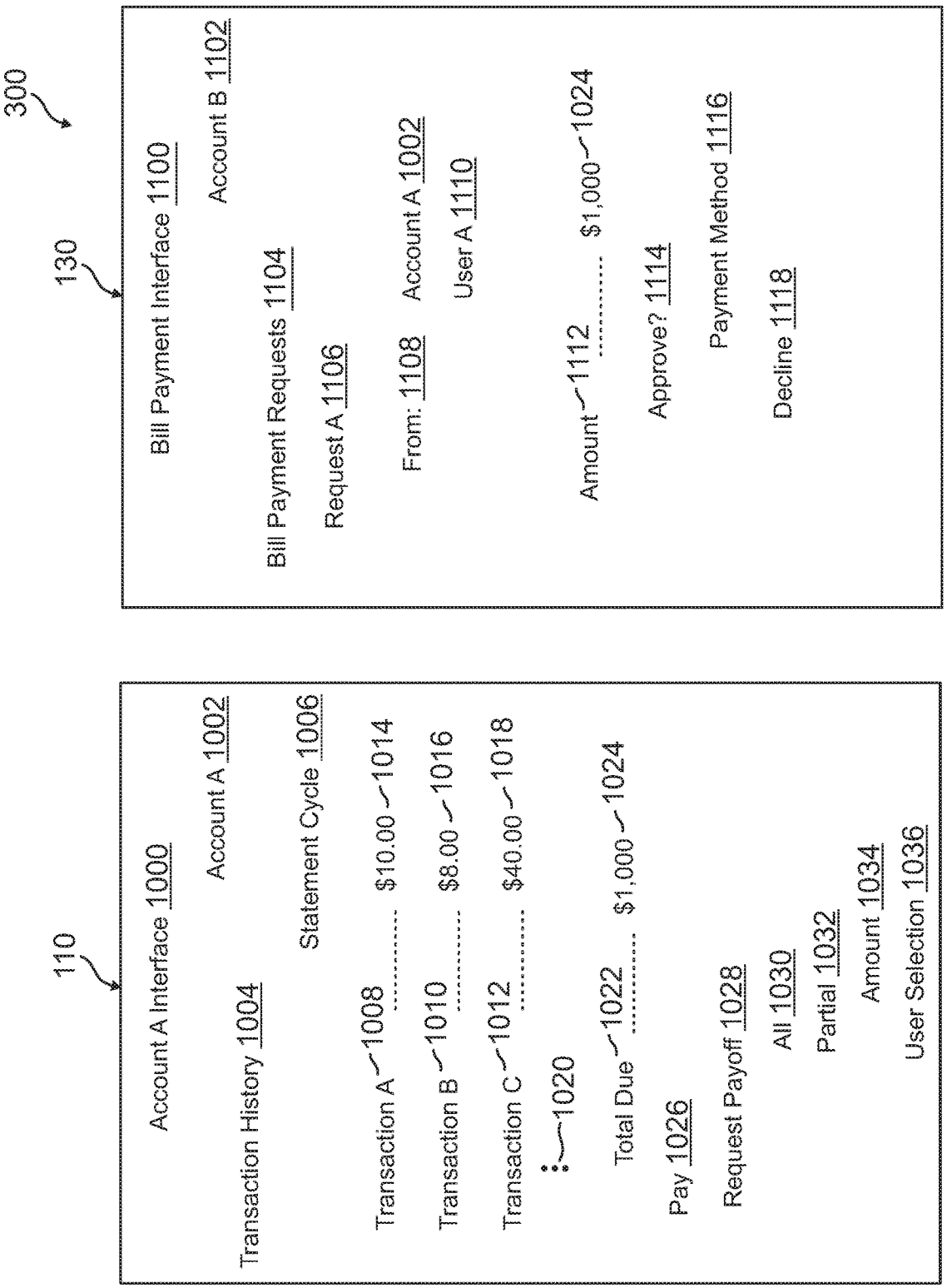
FIG. 3 is an exemplary environment with a device application interface showing an assignment of an account statement balance from one user to another user, according to an embodiment.

FIG. 3 is an exemplary environment with a device application interface showing an assignment of an account statement balance from one user to another user, according to an embodiment. Environment 300 of FIG. 3 includes first computing device 110 and second computing device 130 discussed in reference to system 100 of FIG. 1. In this regard, first computing device 110 displays a dynamically rendered and displayed interface for an application, such as first payment application 112, while second computing device 130 displays a dynamically rendered and displayed interface for an application, such as second payment application 132.

In environment 300, first computing device 110 displays an account A interface 1000 for an account A 1002, which may be displayed in response to receiving an account statement for a transaction history 1004 accrued over a statement cycle 1006 for a payment instrument or extended revolving credit or asset. In this regard, account A interface 1000 may correspond to an account interface after logging in to account A 1002 and/or navigating to a statement interface for statement viewing and repayment but may also correspond to different types of received messages and communications. Account A interface 1000 allows a first user associated with first computing device 110 to review account charges and transactions over statement cycle 1006 through transaction history 1004. For example, transaction history 1004 includes a transaction A 1008 having total 1014 of $10.00, a transaction B 1010 having a total 1016 of $8.00, and a transaction C 1012 having a total 1018 of $40.00. Additionally, an expandable option 1020 may allow the first user to view additional transactions from statement cycle 1006 and/or other past statement cycles and statements. During statement cycle 1006, transaction history 1004 is associated with a total due 1022 that is required to be paid by the first user by a deadline, shown as total amount 1024 of $1,000.00 in environment 300.

The first user may perform a payment for all or a portion of total amount 1024 in order to meet total due 1022 by the deadline or otherwise satisfy total due 1022. Thus, account A interface 1000 further includes a pay option 1026 that allows the first user to provide one or more payments for total amount 1024. However, the first user may also request one or more payments from other users, such as to satisfy debts owed by the other users, due to relationships with the other users, as gifts from friends or family, or the like. In this regard, account A interface 1000 further includes a request payoff option 1028, which allows the first user to transmit a requested payment from another user. When entered input for request payoff option 1028, the first user may select an amount for the payment, such as an all option 1030 for the entire balance of total amount 1024, or a partial option 1032 for a partial portion of total amount 1024. If partial option 1032 is selected, an amount 1034 may be required to be entered or selected through one or more interface elements. Further, a user selection 1036 may allow for identification and selection of the other user to provide the payment, which may be prepopulated based on past payments, social graphs, and/or other information for the first and/or second user. Where multiple other users are selected, each identifier name be entered and/or selected, and an amount to be split between all of the users may be specified (e.g., total amount 1024, an individual transaction, and/or a portion of total amount 1024). The amount may be initially split evenly, where the first user may utilize one or more inputs to adjust the amount and/or the other users may change the amount when received through their corresponding computing devices.

Thereafter, in environment 300, second computing device 130 displays a bill payment interface 1100. In bill payment interface 1100, an account B 1102 is shown as logged in and accessed, such as an account for a second user associated with second computing device 130. Account B 1102 may therefore be used to process and provide payments for bill payment requests 1104. Under bill payment requests 1104, a request A 1106 may be shown for all or a portion of total amount 1024 requested by the first user of first computing device 110. Thus, request A 1106 is shown with identification of the first user in a from field 1108, where account A 1002 is shown and additional user A information 1110 may be populated (e.g., a contact identifier, name, username, photograph, etc.). Request A 1106 may be also be populated within bill payment interface 1100 with an amount 1112 of the requested payment, shown as total amount 1024 of $1,000. An approval option 1114 is further provided for request A 1106, which, if accepted, provides a payment of $1,000 using account B 1102. The second user may also select a payment method 1116 associated with account B 1102, or a decline option 1118 for declination of the payment. In some embodiments, selecting decline option 1118 may also or instead allow the second user to change amount 1112 to provide a different payment.

In some embodiments, request A 1106 may also be shared with multiple users. For example, three or more users may share a bill, such as a dinner, rent, or a utility payment. Similarly, multiple contacts may share a bill and/or transaction history, such as a family and/or spouses with children or other family members. In this regard, request A 1106 and/or a billing statement with a statement balance may be provided to multiple devices. For example, the first user may utilize first computing device 110 to request payments for total amount 1024 from multiple different devices, where each device is requested to provide a certain amount, percentage, or other value for total amount 1024. Thereafter, a transaction processor may transmit the requests to multiple devices, where each device may display a similar interface to bill payment interface 1100 in the corresponding device and application.

Figure 4:
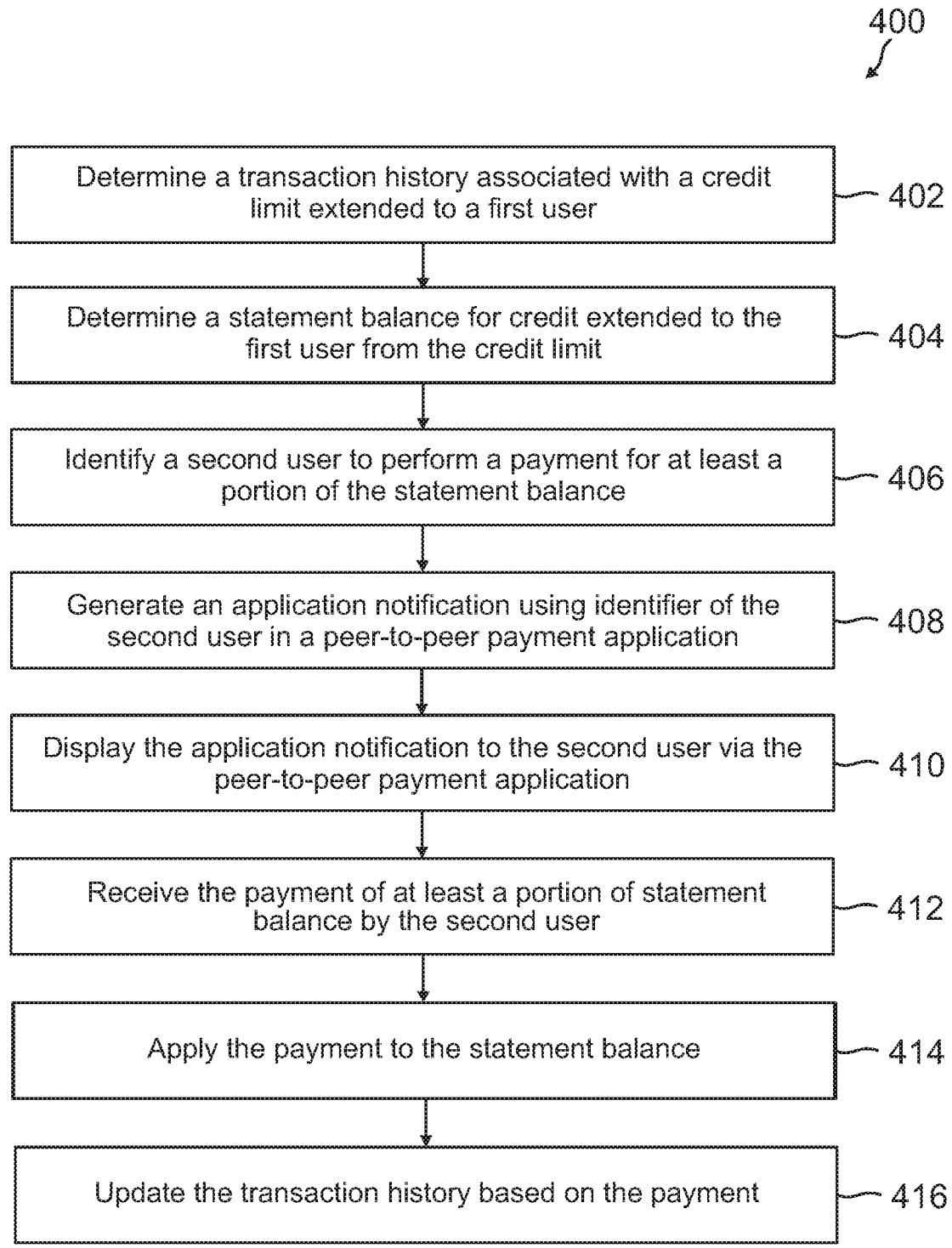
FIG. 4 is a flowchart of an exemplary process for user interfaces for account statement assignment, according to an embodiment.

FIG. 4 is a flowchart of an exemplary process for user interfaces for account statement assignment, according to an embodiment. Note that one or more steps, processes, and methods described herein of flowchart 400 may be omitted, performed in a different sequence, or combined as desired or appropriate.

At step 402 of flowchart 400, a transaction history associated with a credit limit extended to a first user is determined. Determination of the transaction history may include receiving an account statement for a transaction history of transactions processed over a month using a payment card and associated extended value (e.g., from a bank, card processor, or the like). In further embodiments, determination of the transaction history may occur when an online transaction processor monitors usage of the card and extended value, and/or is integrated with an electronic card network to monitor usage of the card over the network. Once the transaction history is determined, for example, for a particular time period or time cycle, at step 404, a statement balance for credit extended to the first user from the credit limit is determined. The statement balance may correspond to a total amount due for the transaction history based on a close of the statement for the time period, such as a monthly balance due for repayment of extended credit used for transactions within the time period and/or earlier processed transactions.

A second user to perform a payment for at least a portion of the statement balance is identified, at step 406. The second user may be determined by the online transaction processor based on previous users that may have provided a payment for an amount of a previous statement balance of the first user. Thus, the second user may be suggested to the second user through one or more application interfaces. However, in other embodiments, the first user may select the second user from a contact list, enter an identifier for the second user, or otherwise provide an indication of the second user. Once identified, at step 408, an application notification is generated using an identifier of the second user in a peer-to-peer payment application. The application notification may correspond to one or more application interfaces and associated data that displays the payment requested by the first user for the second user. Further, the application notification may be associated with an email, text message, or the like that alerts the second user of the requested payment by the second user for all or a portion of the statement balance. In some embodiments, the application notification may correspond to a push notification that may be populated in one or more screens of a GUI.

At step 410, the application notification is displayed to the second user via the peer-to-peer payment application, for example, by rendering the application notification or otherwise causing the application notification to be displayed through a mobile application of the second user's device. In various embodiments, when displaying the application notification, user data of the first user may also be displayed, such as the transaction history, the statement balance, or other information (e.g., a message, identification of the first user, and the like). However, some or all of the user data may also be hidden or not shown with the application notification in order to maintain privacy of the first user, for example, based on privacy settings of the first user. The payment of at least a portion of the statement balance by the second user is received, at step 410. The payment may be for the entire amount requested by the first user. For example, the second user may agree to and accept responsibility for an entire balance or for the entire amount requested by the first user. However, in other embodiments, the payment may instead be for a different amount entered by the second user to one or more interface fields in response to the application notification. Thereafter, the payment is processed using a balance from the second user, for example, using one or more payment instruments.

Thereafter, at step 414, the payment is applied to the statement balance. This may be done by the online transaction processor directly in order to prevent unauthorized usage of the payment by the first user. For example, the online transaction processor may perform a payoff of all or a portion of the statement balance based on the payment by the second user. However, in other embodiments, the online transaction processor may provide the payment into an available balance or value used by the first user to provide payments, which may include restricting the payment's amount to only use of payment of the statement balance. Additionally, one or more stipulations or required actions may also be set on providing the payment to the statement balance, which may be required to be completed prior to the payment and/or monitored for completion after providing the payment to the statement balance. Thereafter, at step 416, the transaction history is updated based on the payment. Updating the transaction history may include changing the statement balance to reflect the payoff of the amount of the payment. Further, the first user may be updated of the new statement balance and/or transaction history based on the payment.

Figure 5:
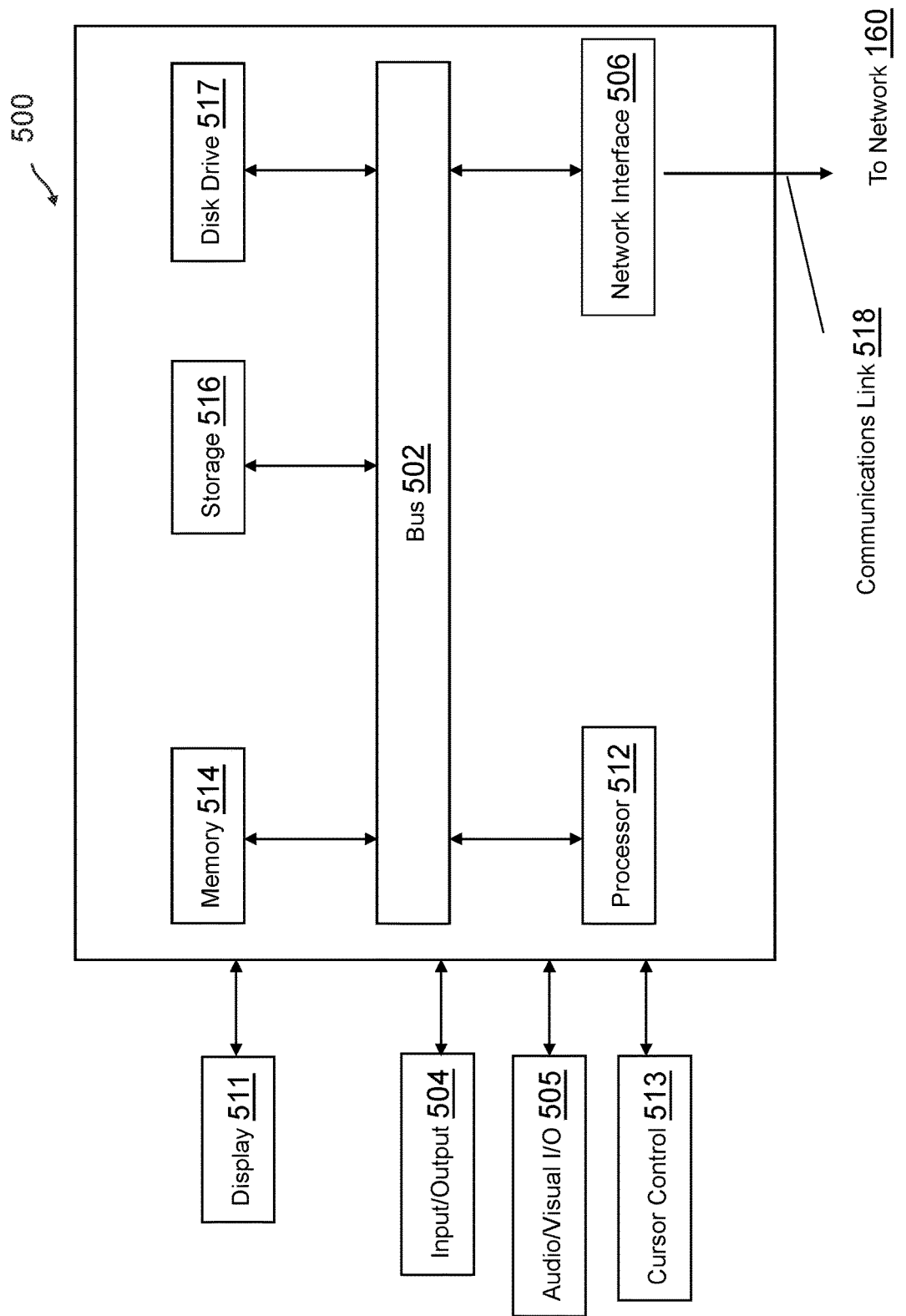
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
listening, via one or more API integrations with a network for electronic card processing, for reading events and scanning events over a time period of data encoded to a physical card of a first user;
based on the listening, automatically updating, for a first mobile application utilized by the first user for a digital account that is associated with the physical card, an account statement comprising a plurality of transactions processed over the time period via the physical card;
receiving an image of a quick response (QR) code encoded on the physical card from a second mobile application utilized by a second user;
determining, using encoded data from the received image of the QR code, the digital account linked with the physical card through an identifier of the physical card;
automatically populating, without an input by the first user, a first user interface of the first mobile application with the account statement for the digital account based on the second mobile application imaging the QR code on the physical card
generating an executable operation for the first user interface, wherein the executable operation requests a first payment be made by the second user for at least a portion of the plurality of transactions on behalf of the first user;
automatically populating, without the input within the first user interface, the executable operation with a first interface element associated with the second user based on the receiving the image from the second mobile application, wherein the first interface element enables electronic transaction processing for the first payment between the first and second mobile applications;
receiving a selection of the first interface element with an identification of the second user by the first user via the first user interface;
determining the second mobile application for the second user based on at least one of the receiving the image or the identification;
generating a second user interface of the second mobile application and a second interface element for the second user interface, wherein the second user interface comprises at least a portion of the account statement that is associated with the first payment and authorized to be visible to the second user in the second mobile application, and wherein the second interface element includes a selectable application operation that enables processing of the first payment by the second user;
alerting the second user through the second mobile application of an availability of the second user interface;
based on an execution or a use of the second mobile application, automatically populating, without an input by the second user, the second user interface with the second interface element in the second mobile application; and
processing the first payment from the second user to an account balance of the account statement.

2. The method of claim 1, further comprising:
populating a third user interface of a third mobile application for a third user with the at least the portion of the account statement, wherein the identification is further of the third user by the first user via the first user interface; and
providing, within the third user interface, a third interface element to perform a second payment associated with the account statement by the third user, wherein the first payment and the second payment comprise one of percentage shares of an account balance of the account statement or value shares of the account balance.

3. The method of claim 1, further comprising:
receiving an acceptance of the first payment via the second interface element,
wherein the processing the first payment is based on the receiving the acceptance.

4. The method of claim 3, wherein the first payment comprises an entire amount of the account balance, wherein the first payment is applied directly to the account balance of the account statement, and wherein a value of the first payment is unavailable for a usage by the first user for additional future transactions via the digital account.

5. The method of claim 3, wherein the first payment comprises the at least the portion of the account balance, and wherein the portion comprises one of a value amount of the account balance, a percentage amount of the account balance, or a value corresponding to one or more of the plurality of transactions.

6. The method of claim 1, further comprising:
receiving a declination of the first payment via the second interface element; and
providing an alert via the first mobile application of the declination, wherein the alert requests that at least the first payment is made by a deadline associated with the account statement.

7. The method of claim 1, wherein the digital account comprises a digital peer-to-peer payment account associated with an online transaction processor providing the first mobile application and the second mobile application, and wherein the online transaction processor provides a digital payment network for a plurality of merchants for the plurality of transactions using at least the digital peer-to-peer payment account and the physical card.

8. The method of claim 1, wherein the selectable application operation comprises a link to an executable option to perform the first payment through the second mobile application or via a website.

9. A system comprising:
a non-transitory memory; and
one or more hardware processors coupled to the non-transitory memory and configured to read instructions from the non-transitory memory to cause the system to perform operations comprising:
monitoring, via one or more API integrations with a network for electronic card processing, for reading events and scanning events over a time period of data encoded to a physical card of a first user;
based on the monitoring, automatically updating, for a first mobile application utilized by the first user for a digital account that is associated with the physical card, an account statement comprising a plurality of transactions processed over the time period via the physical card;

receiving an image of a quick response (QR) code encoded on the physical card from a second mobile application utilized by a second user;

determining, using encoded data from the received image of the QR code, the digital account linked with the physical card through an identifier of the physical card;

automatically populating, without an input by the first user, a first user interface of the first mobile application with the account statement for the digital account based on the second mobile application imaging the QR code on the physical card;

generating an executable operation for the first user interface, wherein the executable operation requests a first payment be made by the second user for at least a portion of the plurality of transactions on behalf of the first user;

automatically populating, without the input within the first user interface, the executable operation with a first interface element associated with the second user based on the receiving the image from the second mobile application, wherein the first interface element enables electronic transaction processing for the first payment between the first and second mobile applications;

receiving a selection of the first interface element with an identification of the second user by the first user via the first user interface;

determining the second mobile application for the second user based on at least one of the receiving the image or the identification;

generating a second user interface of the second mobile application and a second interface element for the second user interface, wherein the second user interface comprises at least a portion of the account statement that is associated with the first payment and authorized to be visible to the second user in the second mobile application, and wherein the second interface element includes a selectable application operation that enables processing of the first payment by the second user;

alerting the second user through the second mobile application of an availability of the second user interface;

based on an execution or a use of the second mobile application, automatically populating, without an input by the second user, the second user interface with the second interface element in the second mobile application; and processing the first payment from the second user to an account balance of the account statement.

10. The system of claim 9, wherein the operations further comprise:

populating a third user interface of a third mobile application for a third user with the at least the portion of the account statement, wherein the identification is further of the third user by the first user via the first user interface; and providing, within the third user interface, a third interface element to perform a second payment associated with the account statement by the third user, wherein the first payment and the second payment comprise one of percentage shares of an account balance of the account statement or value shares of the account balance.

11. The system of claim 9, wherein the operations further comprise:

receiving an acceptance of the first payment via the second interface element, wherein the processing the first payment is based on the receiving the acceptance.

12. The system of claim 11, wherein the first payment comprises an entire amount of the account balance, wherein the first payment is applied directly to the account balance of the account statement, and wherein a value of the first payment is unavailable for a usage by the first user for additional future transactions via the digital account.

13. The system of claim 11, wherein the first payment comprises the at least the portion of the account balance, and wherein the portion comprises one of a value amount of the account balance, a percentage amount of the account balance, or a value corresponding to one or more of the plurality of transactions.

14. The system of claim 9, wherein the operations further comprise:

receiving a declination of the first payment via the second interface element; and providing an alert via the first mobile application of the declination, wherein the alert requests that at least the first payment is made by a deadline associated with the account statement.

15. The system of claim 9, wherein the digital account comprises a digital peer-to-peer payment account associated with an online transaction processor providing the first mobile application and the second mobile application, and wherein the online transaction processor provides a digital payment network for a plurality of merchants for the plurality of transactions using at least the digital peer-to-peer payment account and the physical card.

16. The system of claim 9, wherein the selectable application operation comprises a link to an executable option to perform the first payment through the second mobile application or via a website.

17. A non-transitory machine-readable medium having stored thereon machine-readable instructions executable to cause a machine to perform operations comprising:

listening, via one or more API integrations with a network for electronic card processing, for reading events and scanning events over a time period of data encoded to a physical card of a first user;

based on the listening, automatically updating, for a first mobile application utilized by the first user for a digital account that is associated with the physical card, an account statement comprising a plurality of transactions processed over the time period via the physical card;

receiving an image of a quick response (QR) code encoded on the physical card from a second mobile application utilized by a second user;

determining, using encoded data from the received image of the QR code, the digital account linked with the physical card through an identifier of the physical card;

automatically populating, without an input by the first user, a first user interface of the first mobile application with the account statement for the digital account based on the second mobile application imaging the QR code on the physical card;

generating an executable operation for the first user interface, wherein the executable operation requests a first payment be made by the second user for at least a portion of the plurality of transactions on behalf of the first user;

automatically populating, without input within the first user interface, the executable operation with a first interface element associated with the second user based on the receiving the image from the second mobile application, wherein the first interface element enables electronic transaction processing for the first payment between the first and second mobile applications;

receiving a selection of the first interface element with an identification of the second user by the first user via the first user interface;

determining the second mobile application for the second user based on at least one of the receiving the image or the identification;

generating a second user interface of the second mobile application and a second interface element for the second user interface, wherein the second user interface comprises at least a portion of the account statement that is associated with the first payment and authorized to be visible to the second user in the second mobile application, and wherein the second interface element includes a selectable application operation that enables processing of the first payment by the second user;

alerting the second user through the second mobile application of an availability of the second user interface;

based on an execution or a use of the second mobile application, automatically populating, without an input by the second user the second user interface with the second interface element in the second mobile application; and processing the first payment from the second user to an account balance of the account statement.

18. The non-transitory machine-readable medium of claim 17, wherein the operations further comprise:

populating a third user interface of a third mobile application for a third user with the at least the portion of the account statement, wherein the identification is further of the third user by the first user via the first user interface; and providing, within the third user interface, a third interface element to perform a second payment associated with the account statement by the third user, wherein the first payment and the second payment comprise one of percentage shares of an account balance of the account statement or value shares of the account balance.

19. The non-transitory machine-readable medium of claim 17, wherein the operations further comprise:

receiving an acceptance of the first payment via the second interface element, wherein the processing the first payment is based on the receiving the acceptance.

20. The non-transitory machine-readable medium of claim 19, wherein the first payment comprises an entire amount of the account balance, wherein the first payment is applied directly to the account balance of the account statement, and wherein a value of the first payment is unavailable for a usage by the first user for additional future transactions via the digital account.

* * * * *